(12) United States Patent
Wu et al.

(10) Patent No.: US 11,488,184 B2
(45) Date of Patent: Nov. 1, 2022

(54) SYSTEMS, METHODS, AND APPARATUSES FOR FORECASTING MERCHANT PERFORMANCE

(71) Applicant: VISA INTERNATIONAL SERVICE ASSOCIATION, San Francisco, CA (US)

(72) Inventors: Keyuan Wu, Singapore (SG); Roan Joy Halili Cuares, Singapore (SG)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 481 days.

(21) Appl. No.: 16/516,755

(22) Filed: Jul. 19, 2019

(65) Prior Publication Data

US 2021/0019773 A1 Jan. 21, 2021

(51) Int. Cl.
*G06Q 10/06* (2012.01)
*G06Q 30/02* (2012.01)

(52) U.S. Cl.
CPC ....... *G06Q 30/0202* (2013.01); *G06Q 10/067* (2013.01)

(58) Field of Classification Search
None
See application file for complete search history.

(56) References Cited

U.S. PATENT DOCUMENTS

| | | | | |
|---|---|---|---|---|
| 10,460,332 B1* | 10/2019 | Kujat | ................ | G06Q 30/0202 |
| 2010/0076813 A1* | 3/2010 | Ghosh | .................... | G06Q 30/02 |
| | | | | 705/7.34 |
| 2012/0158566 A1* | 6/2012 | Fok | ........................ | G06Q 40/00 |
| | | | | 705/35 |
| 2017/0186021 A1* | 6/2017 | Lee | .................... | G06Q 30/0201 |

* cited by examiner

Primary Examiner — Alan Torrico-Lopez
(74) Attorney, Agent, or Firm — Loeb & Loeb LLP

(57) ABSTRACT

Merchant transaction data for a group of merchants, category transaction data for the group of merchants, and merchant location data for the group of merchants may be obtained for a first time period and a second time period. The merchant transaction data may include a first set of parameters. The category transaction data may include a second set of parameters, and the location data may include a third set of parameters. Additional data during the first time period and the second time period may also be obtained. The additional data may include a fourth set of parameters. The merchant transaction data, the category transaction data, the merchant location data, and the additional data may be analyzed using a machine learning program to generate a set of key parameters to predict merchant performance. A first list of merchants that are predicted to grow may be generated using the key parameters.

16 Claims, 5 Drawing Sheets

SYSTEMS, METHODS, AND APPARATUSES FOR FORECASTING MERCHANT PERFORMANCE

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In general, an electronic transaction payment system has four key players: merchants, payment networks, acquiring banks (a.k.a. acquirers), and issuing banks (a.k.a. issuers). At a high level, a merchant provides a payment gateway, such as a point of sale (POS) terminal or a checkout page on its website, where consumers can pay for selected goods and/or services using a transaction card or an electronic payment account such as a wallet account. An acquirer receives transaction data and account information from the transaction card, electronic payment account, and/or consumer via the merchant's payment gateway. The acquirer then sends the transaction data, the account information, and an authorization request to an issuer associated with the transaction card or electronic payment account via a payment network. The issuer approves or declines the authorization request and transaction amount and such information is sent back to the acquirer via the payment network. If the transaction is approved, funds are taken out of the consumers account with the issuer and deposited into the merchant's account with the acquirer.

Acquiring banks or acquirers are named for the role they play in the electronic transaction processing. An acquirer provides and maintains a merchant account for each merchant it services. A merchant account is an open line of credit that allows the acquiring bank to accept or acquire transactions on behalf of a merchant and deposit funds received from the merchant's sales into the merchant account. Acquiring banks take on the risk associated with the electronic transactions they process on behalf of their merchants. For example, if a merchant becomes insolvent and unable to fund a reversal, refund, or chargeback, then the acquirer is required to provide the funds to the consumer.

To counter the risk they take on, acquirers make money in a variety of ways. For example, acquiring banks sell POS terminals to merchants at a one-time cost. In addition, the merchant is charged a per transaction fee, which is shared between the acquirer, payment network, and issuer. Further, all transactions at the merchant's POS are settled by the acquirer at regular intervals. During the time the money resides with the acquiring bank, it is invested and interest is earned thereon.

Because the revenue an acquirer receives is based on the size and health of the merchant (e.g., number of POS terminals, total transaction amount, and total number of transactions), there exists a need to forecast or predict merchant performance in a future time period so that proper action can be taken by an acquirer to maintain and grow revenue streams. In particular, there exists a need to identify declining, stagnant, and growing merchants so that an acquirer can provide targeted offers and incentives to its merchants.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In some embodiments, merchant transaction data for a group of merchants, category transaction data for the group of merchants, and merchant location data for the group of merchants may be obtained for a first time period and a second time period. The merchant transaction data may include a first set of parameters. The category transaction data may include a second set of parameters and the location data may include a third set of parameters. Additional data during the first time period and the second time period may also be obtained. The additional data may include a fourth set of parameters. The merchant transaction data, the category transaction data, the merchant location data, and the additional data may be analyzed using a machine learning program to generate a set of key parameters to predict merchant performance. A first set of merchants that are predicted to grow may be generated using the key parameters.

The figures depict various embodiments for purposes of illustration only. One skilled in the art may readily recognize from the following discussion that alternative embodiments of the structures and methods illustrated herein may be employed without departing from the principles described herein.

DETAILED DESCRIPTION

At a high level, the systems, methods, and apparatuses described herein are designed and built to attempt to identify merchants that are declining, stagnant, or growing. Currently, acquirers do not have the ability to predict how merchants will perform in the future in order to be able to provide targeted incentives or offers to increase transaction amount or volume or to forecast when additional POS terminals should be added. Thus, there exists a need for technology to help predict merchant performance in a future time period so that proper action may be taken by an acquirer to maintain and grow its revenue streams. In particular, there exists a need for technology to identify declining, stagnant, and growing merchants so that an acquirer can provide targeted offers and incentives to its merchants including the offering of additional POS terminals.

Figure 1:
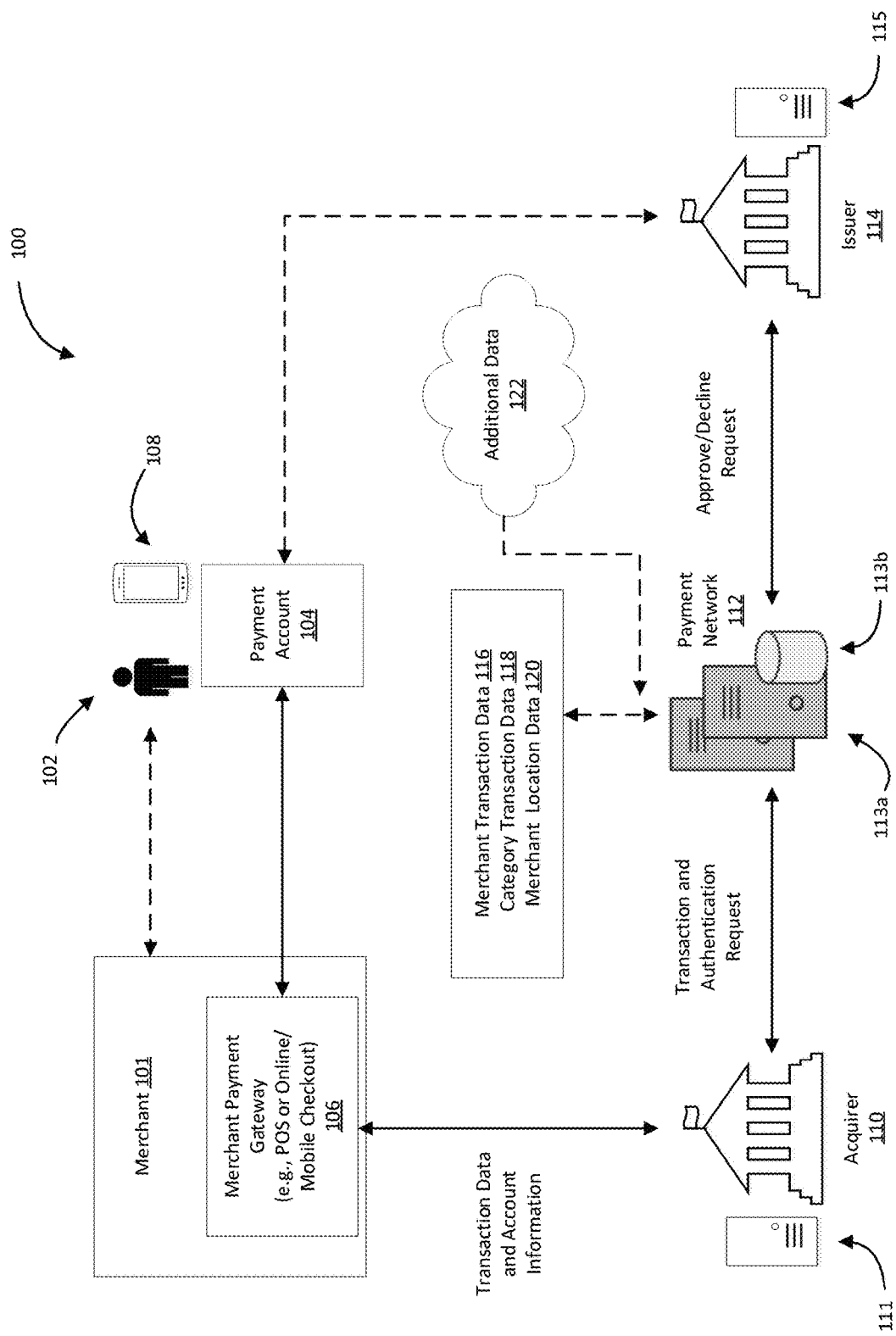
FIG. 1 illustrates a diagram of an exemplary electronic transaction payment system and network.

FIG. 1 generally illustrates an exemplary electronic transaction payment system 100. The electronic transaction system may include a merchant 101, which may have a merchant payment gateway 106. The merchant payment gateway 106 may be a POS device and/or an online or mobile portal where a consumer 102 can select and pay for goods and/or services offered by or through the merchant 101. The consumer 102 may pay for his goods/services using cash, a transaction card associated with a payment account 104, and/or a digital wallet account associated with the payment account 104 via a user device 108.

The merchant payment gateway 106 may be in communication with an acquirer 110. The merchant payment gateway 106 may send transaction data including transaction amount and account information including payment account number, expiration date, CVV, zip code, and other information obtained at the merchant payment gateway 106 from the consumer, transaction card, and/or wallet account to the acquirer 110, which may have or be in communication with one or more payment processors 111.

The acquirer 110 may receive the transaction data and account information from the merchant payment gateway 106 and may send, via the payment processor 111, the transaction data and account information along with a transaction and authentication request to an issuing bank 114 via a payment network 112.

The payment network 112 may have one or more processors 113a and one or more databases 113b. The payment network 112 may serve as an intermediary between the acquirer 110 and the issuer 114 and may facilitate transactions between the merchant 101 and consumer 102. The payment network 112 may be a payment network such as Visa®, MasterCard®, American Express®, or Discover®.

The payment network 112 may obtain and store various data via its processors and databases 113a,b regarding the transactions it facilitates including data relating to consumer 102, payment account 104, merchant 101, acquirer 110, and issuer 114. For example, the payment network 112 may obtain and store merchant transaction data 116, category transaction data 118, and merchant location data 120. In addition, the payment network 112 may be in communication with third parties that provide additional data 122.

The payment account 104 may be issued by or otherwise associated with issuer 114. The issuer 114 may have one or more processors 115 and may authenticate the account information and check to see whether there are sufficient funds in the payment account 104 to cover the transaction amount. If the account information is authenticated and there are adequate funds in the payment account 104, then the issuer 114 may approve the transaction and authentication request. If the account information cannot be authenticated and/or the payment account 104 does not contain sufficient funds, then the transaction and authentication request may be declined by the issuer 114.

If the transaction is approved, then the issuer 114 may send the authentication confirmation to the acquirer 110 via the payment network 112 and may debit the payment account 104. The payment network 112 may handle the exchange of funds from the payment account 104 maintained by the issuer 114 to a deposit account for the merchant 101, which may be provided and maintained by the acquirer 110.

Figure 2:
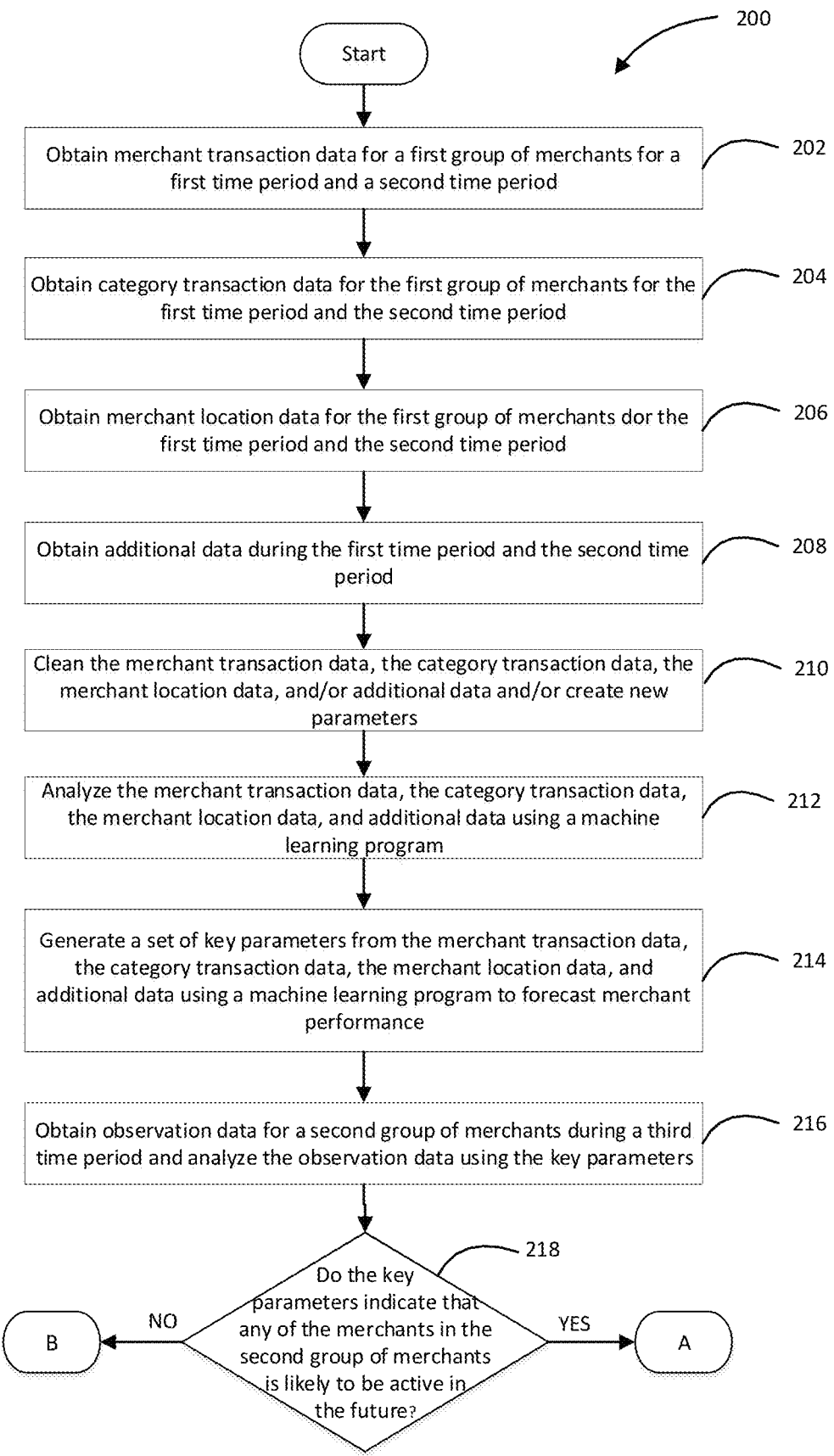
FIG. 2 is a flowchart of an embodiment of a method for forecasting merchant performance.

FIG. 2 generally illustrates an exemplary method 200 for forecasting merchant performance. At a block 202, merchant transaction data 116 for a first group of merchants may be obtained. The first group of merchants may comprise one or more merchants 101. The merchant transaction data 116 may include data from a first time period and a second time period. The first time period and second time period may be different. For example, the first time period may include data from any of one month up to twelve months (e.g., January, January and February, January-March, . . . . or January-December, etc.) during a first year. The first year may be defined as a set of consecutive months regardless of the actual calendar year the months fall in (e.g., January 2016-April 2016, January 2016-December 2016, December 2016-May 2017, or October 2016-September 2017). Likewise, the second time period may include data from any of one month up to twelve months during a second year. The second year may also be defined as a set of consecutive months regardless of the actual calendar year the months fall in (e.g., January 2017-April 2017, January 2017-December 2017, December 2017-May 2018, or October 2017-September 2018). In addition, the first time period and first year may come before the second time period and second year.

The first group of merchants may be comprised of active and dormant merchants. Active merchants may be merchants that have transaction activity (e.g., at least one transaction) during the second time period. Active merchants may be further divided into growing and stagnant and/or declining. Growing merchants may be those merchants that have an increase transaction amount in the second time period compared to the first time period and have no decrease in transaction volume. Stagnant and/or declining merchants are those that may have: 1) an increase in transaction amount in the second time period compared to the first time period, but have a decline in transaction volume; 2) a decrease in overall transaction volume in the second time period compared to the first time period and no decline in transaction volume; and/or 3) a decrease in overall transaction volume in the second time period compared to the first time period and a decline in transaction volume. A merchant may be dormant if it does not have any transaction activity during the second time period. A merchant may become dormant, for example, if it goes out of business, becomes insolvent, or switches to a different payment network (e.g., Visa® to MasterCard®).

The merchant transaction data 116 may also include a first set of parameters. The first set of parameters may be stored and maintained by the payment network 112 and may include a very large dataset. For example, the first set of parameters may include over 1600 variables that are collected by the payment network 112 in relation to each merchant 101. The first set of parameters may include, for example: total spend per month; total transactions per month; number of cardholder acceptance identification (CAID); spend per CAID; number of accounts; spend per account; transactions per account; international transactions; average ticket size; spend per card; transactions per card; repeat customers; type of card (e.g., credit, debit, or prepaid); type of account (e.g., consumer, business, or corporate); location of spend; location of transaction; and/or merchant category codes (MCC) (e.g., Food & Grocery, Restaurants, Drug Store & Pharmacy, etc.).

At a block 204, category transaction data 118 for the first group of merchants may be obtained. The category transaction data 118 may include data from the first time period and the second time period. The category transaction data may include a second set of parameters. The second set of parameters may be stored and maintained by the payment network 112 and may include a very large dataset. For example, the second set of parameters may include over 1500 variables or parameters that are collected by the payment network 112 in relation to each merchant 101. The second set of parameters may include, for example: total spend; total transactions; number of merchants; domestic or international customer; average ticket size; type of card; spend per card; transaction per card; location; and/or chargeback amount ratio.

At a block 206, merchant location data for the first group of merchants may be obtained for the first time period and the second time period. The merchant location data may include a third set of parameters. The third set of parameters may be stored and maintained by the payment network 112 and may include a very large dataset. For example, the third set of parameters may include over 1300 variables or parameters that are collected by the payment network 112 in relation to each merchant 101. The third set of parameters may include, for example: total spend; total transactions; number of merchants; domestic or international customer; average ticket size; type of card; spend per card; transaction per card; location; and/or chargeback amount ratio.

At a block 208, additional data may be obtained during the first time period and the second time period. The additional data may come from third party sources such as various government websites, labor unions, market researchers, and census bureaus. The additional data may include a fourth set of parameters, which may include one or more of: transaction type; transaction volume by type; population; population growth; male to female ratio; urban to rural ratio; labor force; and/or marriage age.

At a block 210, the merchant transaction data 116, the category transaction data 118, the merchant location data 120, and/or the additional data 122 may be cleaned to remove any data that is unnecessary or provides information in a way that is unworkable. In addition to the first, second, third, and fourth sets of parameters, additional or new parameters may be generated at block 210 for the merchant transaction data, the category transaction data, the merchant location data, and/or the additional data. For example, parameters that may be created include, for example: repeat customer transactions; number of fraud transactions; and/or number of decline transactions.

At a block 212, the merchant transaction data 116, the category transaction data 118, the merchant location data 120, and additional data 122 may be analyzed using a machine learning program. The machine learning program may be, for example, a machine learning program such as TreeNet® Gradient Boosting or eXtreme Gradient Boosting (XGBoost).

The machine learning program may use the merchant transaction data 116, the category transaction data 118, the merchant location data 120, and additional data 122 for the first time period (e.g., October 2016-September 2017) as an observation window, and may use the merchant transaction data 116, the category transaction data 118, the merchant location data 120, and additional data 122 from the second time period (e.g., October 2017-September 2018) as a prediction window. The machine learning program may use both the observation window and prediction window data to generate, at a block 214, a set of key parameters that may be used to indicate merchant performance. For example, the machine learning program may use the prediction window data to train the machine learning program to identify the key parameters from the observation window that are the best predictors of future performance. In particular, the machine learning program may determine which variables or parameters best predict whether a merchant will be active or dormant in the future and whether active merchants will decline, stagnate, or grow. The set of key parameters may include, for example: spend growth over last six months compared to previous six months; last three months of transaction growth over previous three months; average ticket size; card type transaction amount; and/or transaction amount per cardholder acceptance identification.

At a block 216, observation data for a second group of merchants may be obtained and analyzed using the set of key parameters. The second group of merchants may be the same as or different from the first group of merchants. The second set of merchants may also be a sub-set of the first group of merchants. The observation data may include merchant transaction data 116, category transaction data 118, merchant location data 120, and additional data 122 for the second group of merchants during a third time period. The third time period, similar to the first and second time periods, may be any of one month to twelve months and may be for a period of time that is the same or different from the first time period and the second time period or for a period of time that comes after the first time period and the second time period.

At a block 218, the set of key parameters may be used to determine whether any of the merchants in the second group of merchants is likely to be active or dormant in the future.

Figure 2A:
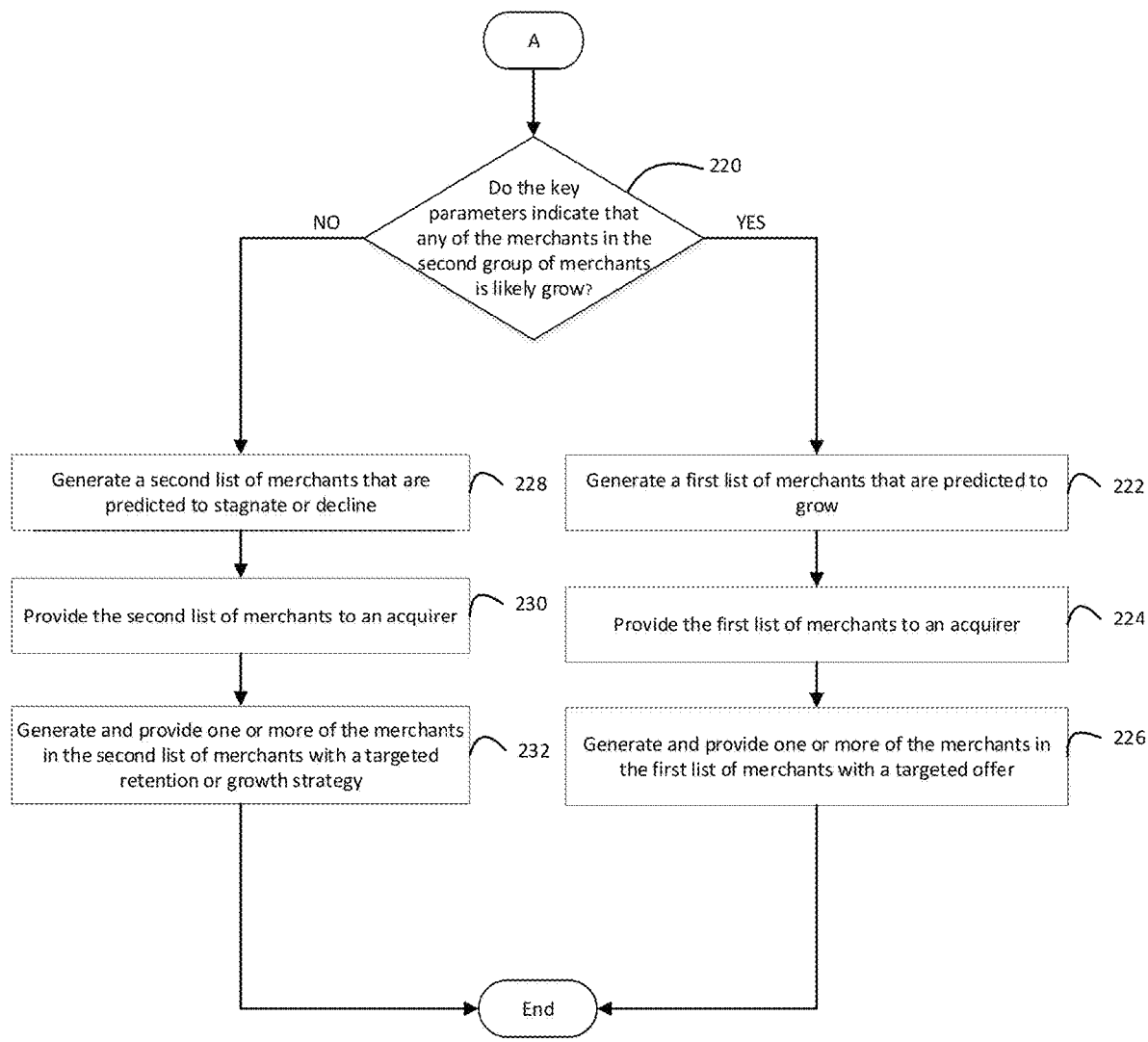
FIG. 2A is a flowchart of the method of FIG. 2.

If the key parameters indicate that any of the merchants in the second group of merchants are likely to be active in the future, the method 200 may continue at a block 220, as shown in FIG. 2A. At the block 220, whether the key parameters indicate that one or more merchants in the second group of merchants is likely to grow is determined. If the key parameters indicated that one or more merchants in the second group of merchants is likely to grow, then, at a block 222, a first list of merchants may be generated.

At a block 224, the first list of merchants may be provided to the acquirer 110 that is associated with the one or more merchants that are indicated to likely grow in the future. At a block 226, the acquirer 110 may generate and provide one or more offers to the merchants in the first list of merchants. For example, the acquirer 110 may offer to sell the growing merchants more POS devices or offer a larger line of credit.

If the key parameters indicate that one or more merchants in the second group of merchants is likely to be active, but not likely to grow, then the method may proceed at a block 228 as shown in FIG. 2A. At a block 228, a second list of merchants that are predicted to stagnate or decline may be generated and provided to the acquirer 110 associated with the one or merchants at a block 230. The acquirer 110 may generate and provide the one or more of the merchants in the second list with a targeted retention plan or a growth strategy or other offer. For example, the acquirer 110 may offer the stagnant or declining merchants in the second list a reduction in transaction fees if a certain transaction amount or volume is reached during a predetermined time period.

Figure 2B:
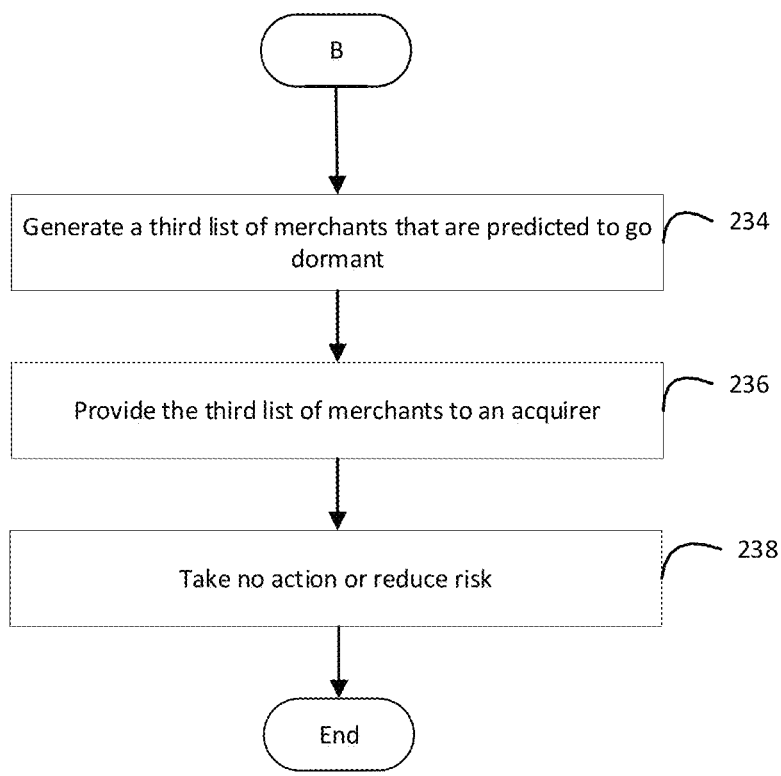
FIG. 2B is a flowchart of the method of FIG. 2.

If the key parameters indicate that one or more merchants in the second group of merchants is not likely to be active, the method may proceed at a block 234 as shown in FIG. 2B. At a block 234, a third list of merchants may be generated. The third list of merchants may be those merchants that are predicted to go dormant in the future. The third list of merchants may be provided to the acquirer 110 that is associated with the one or more merchants that are indicated to go dormant at a block 236. The acquirer 110 may choose to take no action with respect to the merchants predicted to go dormant or the acquirer may take steps to reduce risk such as lower the merchant's credit line at a block 238.

The ability to address the technical problem of predicting a merchant's future performance may be just one of many a practical application of these technologies, which benefits acquirers and merchants. Acquirers benefit as they are provided with a list of merchants that are categorized based on predicted future performance, which can be used to provide targeted offers, thereby reducing risk and increasing revenue. Merchants benefit from receiving targeted offers and incentives, which may in turn help them grow or expand.

The various devices and system components, such as user device 103, payment account 104, merchant payment gateway 106, acquirer 110, payment processor 111, payment network 112, and issuer 114, may be able to communicate via a communication network such as cellular service, through the Internet, a private network, etc., having a variety of communication channels. In some embodiments, the communication channels may be wired such as through an Ethernet cable, a USB cable or RJ6 cable. In other embodiments, the communication channels may be wireless such as through Wi-Fi (802.11 standard), Bluetooth, cellular communication or near field communication (NFC) devices. The communication between the devices and the other components of the systems may be direct or through a wireless network, e.g., Bluetooth, etc.

Figure 3:
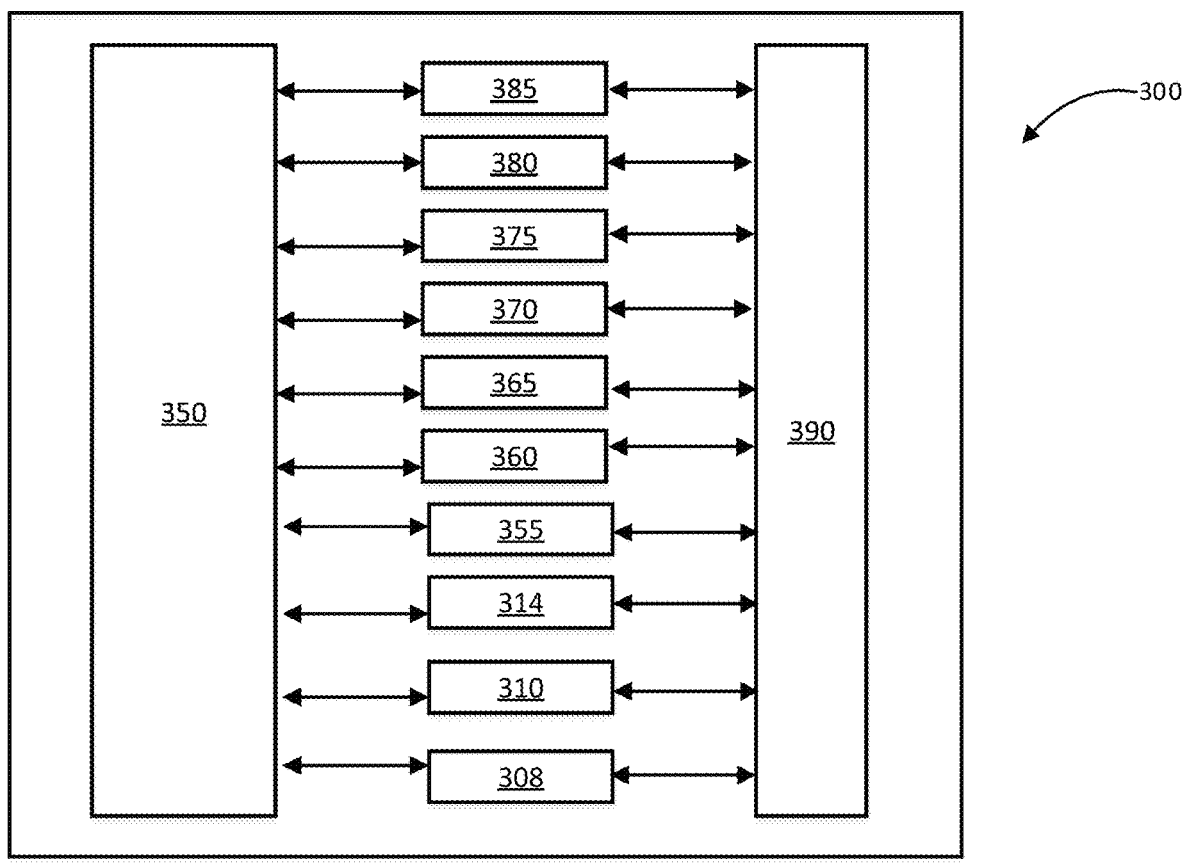
FIG. 3 is a block diagram of system components of an exemplary processor in a system for forecasting merchant performance.

FIG. 3 may be an example computing device 300, such as merchant payment gateway 106 or user device 108, that may be physically configured to interact with another computing device such as merchant payment gateway 106, payment processor 111, and various other components of system 100. The computing device 300 may have a processor 350 that is physically configured according to computer executable instructions. The computing device 300 may have a portable power supply 355 such as a battery which may be rechargeable. It may also have a sound and video module 360 which assists in displaying video and sound and may turn off when not in use to conserve power and battery life. The computing device 300 may also have volatile memory 365 and non-volatile memory 370, as well as internal storage 375 or external storage 380. The computing device 300 may have GPS capabilities 385 that may be a separate circuit or may be part of the processor 350. There also may be an input/output bus 390 that shuttles data to and from the various user input devices such as a camera 308, a receiver 310, and other inputs 314, etc. It also may control communicating with other computing devices and system components, either through wireless or wired devices. Of course, this is just one embodiment of the computing device 300 and the number and types of computing devices 300 is limited only by the imagination.

The electronic transaction payment system 100 may also have one or more processors such as payment processor 111, payment network processor 113a, or issuer processor 115, a memory, and an input output circuit. The one or more processors may be physically configured according to instructions to enable the communication, generation and interpretation of the information received by the merchant payment gateway 106 as well as information received and sent from the acquirer 110, the payment network 112, and issuer 114. The instructions to physically configure the processor to communicate, generate and interpret the information may be custom written, may be from a "white label" source or may be a combination of both.

As a result of the system, methods, and apparatuses disclosed herein, numerous technical problems may be addressed and solved. For example, by using the system, methods, and apparatuses disclosed, an acquirer may use the future merchant performance predictions to properly allocate computer systems and processors to those merchants that are likely to grow so that there is a decrease, or at least not an increase, in the time it takes for transactions to be processed by the acquirer due to increased transactions at the growing merchant. In addition, the system, methods, and apparatuses disclosed may decrease the number of computer systems and processor cycles needed to process offers, which may be provided to and accepted by merchants, that are irrelevant or inappropriate given the merchant's future performance, e.g., offering additional POS devices or increased credit lines to merchants that are stagnant, declining, or predicted to go dormant.

In accordance with the provisions of the patent statutes and jurisprudence, exemplary configurations described above are considered to represent a preferred embodiment of the disclosure. However, it should be noted that the claimed method and systems can be practiced otherwise than as specifically illustrated and described without departing from its spirit or scope.

The computing devices, processors, and servers described herein may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The computing devices, processors, and/or servers described herein may be running on any one of many operating systems including, but not limited to WINDOWS, UNIX, LINUX, MAC OS, or Windows (XP, VISTA, etc.). It is contemplated, however, that any suitable operating system may be used for the present disclosure. The servers may be a cluster of web servers, which may each be LINUX based and supported by a load balancer that decides which of the cluster of web servers should process a request based upon the current request-load of the available server(s).

The computing devices, processors, and/or servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, point of sale terminals, computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present disclosure as described above can be implemented in the form of control logic using computer software in a modular or integrated manner. Based on the disclosure and teachings provided herein, a person of ordinary skill in the art may know and appreciate other ways and/or methods to implement the present disclosure using hardware, software, or a combination of hardware and software.

The above description is illustrative and is not restrictive. Many variations of the disclosure will become apparent to those skilled in the art upon review of the disclosure. The scope of the disclosure and claims should, therefore, be determined not with reference to the above description, but instead should be determined with reference to the pending claims along with their full scope or equivalents.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow diagram, a narrative, and/or in any other manner that provides sufficient structure for those of ordinary skill in the art to implement the recited process and its equivalents.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment. One or more features from any embodiment may be combined with one or more features of any other embodiment without departing from the scope of the disclosure. A recitation of "a", "an" or "the" is intended to mean "one or more" unless specifically indicated to the contrary. Recitation of "and/or" is intended to represent the most inclusive sense of the term unless specifically indicated to the contrary.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

We claim:

1. A computer-implemented method for forecasting merchant performance:

receiving from a plurality of merchant payment gateways at a payment processor of an acquirer merchant transaction data for a first group of merchants for a first time period and a second time period, wherein the merchant transaction data includes a first set of parameters;

sending, over a payment network, the merchant transaction data for the first group of merchants for the first time period and the second time period from the payment processor of the acquirer to a processor of the payment network;

receiving, at the processor of the payment network, from the payment processor of the acquirer over the payment network category transaction data for the first group of merchants for the first time period and the second time period, wherein the category transaction data includes a second set of parameters;

receiving, at the processor of the payment network, from the payment processor of the acquirer over the payment network merchant location data for the first group of merchants for the first time period and the second time period, wherein the merchant location data includes a third set of parameters;

receiving, at the processor of the payment network, over the payment network additional data from one or more third parties during the first time period and the second time period, wherein the additional data includes a fourth set of parameters;

storing the merchant transaction data, the category transaction data the merchant location data, and the additional data during the first time period and the second time in a database that is in communication with the processor of the payment network;

analyzing, via the processor of the payment network that is in communication with the database, the merchant transaction data, the category transaction data, the merchant location data, and the additional data during the first time period and the second time period using a machine learning program to generate a set of key parameters;

in response to generating a set of key parameters,
    generating, via the processor of the payment network, a first list of merchants that are predicted to grow using the key parameters;
    sending, over the payment network, the first list of merchants that are predicted to grow from the processor of the payment network to the acquirer;
    generating an offer for one or more merchants on the first list of merchants that are predicted to grow, wherein the acquirer sends the offer to the one or more merchants on the first list of merchants;

generating, via the processor of the payment network, a second list of merchants that are declining using the key parameters;

sending, over the payment network, the second list of merchants that are declining from the processor of the payment network to the payment processor of the acquirer;

creating a retention plan for one or more of the merchants of the second list of merchants that are declining, wherein the retention plan is implemented by the payment processor of the acquirer;

generating, via the processor of the payment network, a third list of merchants predicted to go dormant using the key parameters;

sending, over the payment network, the third list of merchants that are predicted to go dormant from the processor of the payment network to the payment processor of the acquirer; and, reducing the credit line of one or more merchants of the third list of merchants.

2. The method of claim 1, wherein the first time period is any one of 1 month to 12 months.

3. The method of claim 1, wherein the second time period is any one of 1 month to 12 months.

4. The method of claim 1, wherein the step of generating a first list of merchants, further comprises:

obtaining observation data for a second group of merchants during a third time period, wherein the observation data for the second group of merchants includes merchant transaction data for the second group of merchants during the third time period, category transaction data for the second group of merchants during the third time period, merchant location data for the second group of merchants during the third time period, and additional data during the third time period, and analyzing the observation data using the key parameters.

5. The method of claim 4, wherein the third time period is any one of 1 month to 12 months.

6. The method of claim 1, further comprising:

Cleaning one or more of the merchant data, the category transaction data, the merchant location data, and the additional data.

7. The method of claim 1, wherein the first set of parameters include one or more of: total spend per month; total transactions per month; number of cardholder acceptance identification; spend per cardholder acceptance identification;

number of accounts; spend per account; transactions per account; type of card; location of spend; location of transaction; and merchant category codes.

8. The method of claim 1, wherein the second set of parameters include one or more of: total spend; total transactions; number of merchants; domestic or international customer; average ticket size; type of card; spend per card; transaction per card; location; chargeback amount ratio.

9. The method of claim 1, wherein the third sets of parameters include one or more of: total spend; total transactions; number of merchants; domestic or international customer; average ticket size; type of card; spend per card; transaction per card; location; chargeback amount ratio.

10. The method of claim 1, wherein the fourth set of parameters include one or more of: transaction type; transaction volume by type; population; population growth; male to female ratio; urban to rural ratio; labor force; and marriage age.

11. The method of claim 1, wherein the key parameters include one or more of: spend growth over last six months compared to previous six months;

last three months of transaction growth over previous three months; average ticket size;

card type transaction amount; and transaction amount per cardholder acceptance identification.

12. The method of claim 1, further comprising:

creating new parameters for the merchant transaction data, the category transaction data, and the merchant location data.

13. The method of claim 12, wherein the new parameters include one or more of: repeat customer transactions; number of fraud transactions;

and number of decline transactions.

14. A processor-readable non-transitory medium storing processor-issuable instructions configured to cause a processor to:

receive from a plurality of merchant payment gateways at a payment processor of an acquirer merchant transaction data for a group of merchants for a first time period and a second time period, wherein the merchant transaction data includes a first set of parameters;

send, over a payment network, the merchant transaction data for the first group of merchants for the first time period and the second time period from the payment processor of the acquirer to a processor of the payment network;

receive, at the processor of the payment network, from the payment processor of the acquirer over the payment network category transaction data for the group of merchants for the first time period and the second time period, wherein the category transaction data includes a second set of parameters;

receive, at the processor of the payment network, from the payment processor of the acquirer over the payment network merchant location data for the group of merchants for the first time period and the second time period, wherein the merchant location data includes a third set of parameters;

receive, at the processor of the payment network, over the payment network additional data from one or more third parties during the first time period and the second time period, wherein the additional data includes a fourth set of parameters;

store the merchant transaction data, the category transaction data the merchant location data, and the additional data during the first time period and the second time in a database that is in communication with the processor of the payment network;

analyze, via the processor of the payment network that is in communication with the database, the merchant transaction data, the category transaction data, the merchant location data, and the additional data during the first time period and the second time period using a machine learning program to generate a set of key parameters; and, in response to generating the set of key parameters, generate, via the processor of the payment network, a first list of merchants that are predicted to grow using the key parameters;

send, over the payment network, the first list of merchants that are predicted to grow from the processor of the payment network to the acquirer;

generate an offer for one or more merchants on the first list of merchants that are predicted to grow, wherein the acquirer sends the offer to the one or more merchants on the first list of merchants;

generate, via the processor of the payment network, a second list of merchants that are declining using the key parameters;

send, over the payment network, the second list of merchants that are declining from the processor of the payment network to the payment processor of the acquirer;

create a retention plan for one or more of the merchants of the second list of merchants that are declining, wherein the retention plan is implemented by the— payment processor of the acquirer;

generate, via the processor of the payment network, a third list of merchants predicted to go dormant using the key parameters;

send, over the payment network, the third list of merchants that are predicted to go dormant from the processor of the payment network to the payment processor of the acquirer; and, reduce the credit line of one or more merchants of the third list of merchants.

15. A system for forecasting merchant performance comprising:

a payment network in communication with a database;

a processor in communication with the payment network and the database, wherein the processor is configured to:

receive from a plurality of merchant payment gateways at a payment processor of an acquirer merchant transaction data for a group of merchants for a first time period and a second time period, wherein the merchant transaction data includes a first set of parameters;

send, over a payment network, the merchant transaction data for the first group of merchants for the first time period and the second time period from the payment processor of the acquirer to a processor of the payment network;

receive from payment processor of the acquirer over the payment network category transaction data for the group of merchants for the first time period and the second time period, wherein the category transaction data includes a second set of parameters;

receive from payment processor of the acquirer over the payment network merchant location data for the group of merchants for the first time period and the second time period, wherein the merchant location data includes a third set of parameters;

receive over the payment network additional data from one or more third parties during the first time period and the second time period, wherein the additional data includes a fourth set of parameters;

store the merchant transaction data, the category transaction data the merchant location data, and the additional data during the first time period and the second time in the database;

analyze the merchant transaction data, the category transaction data, the merchant location data, and the additional data during the first time period and the second time period using a machine learning program to generate a set of key parameters;

in response to generating the set of key parameters:
generate a first list of merchants that are predicted to grow using the key parameters;

send, over the payment network, the first list of merchants that are predicted to grow to the payment processor of the acquirer;

generate an offer for one or more merchants on the first list of merchants that are predicted to grow, wherein the acquirer sends the offer to the one or more merchants on the first list of merchants;

generate a second list of merchants that are declining using the key parameters;

send, over the payment network, the second list of merchants that are declining to the payment processor of the acquirer;

create a retention plan for one or more of the merchants of the second list of merchants that are declining, wherein the retention plan is implemented by the acquirer;

generate a third list of merchants predicted to go dormant using the key parameters;

send, over the payment network, the third list of merchants that are predicted go dormant to the payment processor of the acquirer; and, reduce the credit line of one or more merchants of the third list of merchants.

16. The system of claim 15, wherein the first time period and the second time period are any one of 1 month to 12 months.

* * * * *